US012587606B2

(12) United States Patent
Boutmans

(10) Patent No.: US 12,587,606 B2
(45) Date of Patent: Mar. 24, 2026

(54) METHOD FOR MANUFACTURING A DECORATIVE SHEET AND A METHOD FOR MANUFACTURING A DECORATIVE PANEL COMPRISING A DECORATIVE SHEET

(71) Applicant: Unilin, BV, Wielsbeke (BE)

(72) Inventor: Beauregard Boutmans, Wielsbeke (BE)

(73) Assignee: Unilin, BV, Wielsbeke (BE)

( * ) Notice: Subject to any disclaimer, the term of this patent is extended or adjusted under 35 U.S.C. 154(b) by 375 days.

(21) Appl. No.: 18/519,027

(22) Filed: Nov. 26, 2023

(65) Prior Publication Data

US 2024/0181801 A1 Jun. 6, 2024

(30) Foreign Application Priority Data

Dec. 6, 2022 (EP) .................................... 22211771

(51) Int. Cl.
| | |
|---|---|
| *H04N 1/46* | (2006.01) |
| *B44C 1/16* | (2006.01) |
| *H04N 1/60* | (2006.01) |

(52) U.S. Cl.
CPC ................. *H04N 1/60* (2013.01); *B44C 1/16* (2013.01); *H04N 1/6047* (2013.01); *H04N 1/6055* (2013.01)

(58) Field of Classification Search
CPC ....... H04N 1/60; H04N 1/6047; H04N 1/6055
See application file for complete search history.

(56) References Cited

U.S. PATENT DOCUMENTS

| | | | | |
|---|---|---|---|---|
| 6,836,345 B1 * | 12/2004 | Setchell | ............... | H04N 1/6055 358/1.9 |
| 2002/0067518 A1 * | 6/2002 | Benz | .................... | H04N 1/6033 358/518 |
| 2022/0109781 A1 | 4/2022 | Morovic et al. | | |

FOREIGN PATENT DOCUMENTS

| | | | |
|---|---|---|---|
| EP | 1290290 | B1 | 3/2003 |
| EP | 1787811 | A2 | 5/2007 |
| EP | 1857511 | B1 | 11/2007 |
| EP | 1872959 | B1 | 1/2008 |
| EP | 2293946 | B1 | 3/2011 |
| EP | 2431190 | B1 | 3/2012 |
| EP | 3868559 | A1 | 2/2021 |
| EP | 4068743 | A1 | 10/2022 |
| WO | 2011124503 | A2 | 10/2011 |
| WO | 2014084787 | A1 | 6/2014 |
| WO | 2015118451 | A1 | 8/2015 |

(Continued)

*Primary Examiner* — Ibrahim Siddo

(74) *Attorney, Agent, or Firm* — Capitol City TechLaw

(57) ABSTRACT

A method for manufacturing a decorative sheet may involve providing a first printed substrate having a first decorative image printed using an analog printing technique. A digital copy of the first decorative image may be acquired to obtain a first master image. A first color profile of the first decorative image may be obtained. The first master image may be printed on a second substrate using a digital printing technique to form a second decorative image. A second color profile of the second decorative image may be obtained. The first and the second color profiles may be compared to determine a similarity index. If the similarity index is below a threshold value, then an image processing operation may be performed to obtain a second master image. The first and the second printed substrates may be subjected to a predetermined operation.

20 Claims, 3 Drawing Sheets

(56)                    References Cited

FOREIGN PATENT DOCUMENTS

WO          2015140682  A1      9/2015
WO          2021165539  A1      8/2021

* cited by examiner

METHOD FOR MANUFACTURING A DECORATIVE SHEET AND A METHOD FOR MANUFACTURING A DECORATIVE PANEL COMPRISING A DECORATIVE SHEET

This application claims priority under 35 USC 119(a)-(d) from EP patent application No. 22211771.5 filed on Dec. 6, 2022, the entire contents of which are incorporated herein by reference.

BACKGROUND

1. Field

The present invention relates to a method for manufacturing a decorative sheet of the kind used for forming decorative panels like wall, floor, ceiling or furniture panels. The invention further refer to a method for manufacturing decorative panels using decorative sheets. Decorative panels often comprise a wood-based substrate, such as an MDF or HDF substrate (Medium or High Density Fiberboard) or a substrate material consisting of or essentially made of wood particleboard. In alternative embodiments the panel can comprise a polymeric based substrate, preferably thermoplastic based substrate, such as PVC (Polyvinyl chloride), PP (Polypropylene), LVT (Luxury Vinyl Tile), SPC (Solid Polymer Composite) or WPC (Wood polymer composite) based substrate. The invention can further relate to mineral-based board of cement-based board, like for example, fiber cement-based board or magnesium oxide based board.

The invention is of particular interest when the decorative sheet has to be used in a panel manufacturing process in which one or more steps involve a heat or press treatment, for example heat pressing or thermal lamination.

2. Discussion of Related Art

Traditionally, the decor or pattern of such panels is printed on a printable substrate, for example a paper sheet or a thermoplastic foil, by means of offset or rotogravure printing. The obtained décor sheet is subsequently fixed on top of the substrate according to various techniques that differs on the basis of the panel to be obtained. For manufacturing laminate panels the DPL process can be practiced. According to the DPL process (Direct Pressure Laminate) the decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed under heat and the heat-press treatment results in a mutual connection or adherence of the decorative paper, the substrate and the protective layer, as well as in a hardening of the resin present in the stack. For examples of a DPL process reference is made to EP 1 290 290. Alternatively, for manufacturing the decorative panels thermal lamination or gluing of the decorative sheet can be practiced. According to the thermal lamination process the decorative sheet, often in form a printed thermoplastic foil, is fixed with action of heat and pressure on top of a substrate. Alternatively, the decorative sheet can be thermal laminated to a surface of a transparent or translucent thermoplastic protective layer. In this latter case, after thermal lamination, a stack is formed comprising at least a plate shaped substrate, said decorative sheet and the layer. Said stack can result in a mutual connection or adherence of the layers after thermal lamination or gluing of the decorative sheet with on top of the plate shaped substrate. As a result, a decorative panel is obtained.

The printing of the sheet, paper or foil, by means of an analog printing process, such as by rotogravure or offset printing, at affordable prices inevitably leads to large minimal order quantities of a particular decorative paper or foil and restricts the attainable flexibility. A change of decor or pattern necessitates a standstill of the printing equipment of about 8 hours. This standstill time is needed for exchange of the printing rollers, the cleaning of the printing equipment and for adjusting the colors of the new decor or pattern to be printed.

Instead of analog printing techniques, digital printing techniques, especially inkjet printing techniques, are becoming increasingly popular for the creation of decors or patterns. Such digital techniques can enhance the flexibility in the printing of decors significantly. Reference is amongst others made to the EP 1 872 959, WO 2011/124503, EP 1 857 511, EP 2 431 190, EP 2 293 946, WO 2014/084787, WO 2015/140682 and the WO 2015/118451, where such techniques are disclosed.

If on one hand the transition to digital printing requires the creation of new décor and product destined to be printed using digital printing, on the other hand it may require the conversion of older décor created of analog printing to digital printing. This conversion is often made complex by the different color build up that these two techniques require. With this aim, WO 2021/165539 A1 discloses a method for converting an analog template to a digital template that involves the steps of creating a reference color profile from the analog template and comparing said reference color profile with a color profile measured on the digitally printed pattern obtained from the conversion, adapting the color profile on the basis of said comparison and reiterating said process until the comparison results in a similarity index above a predetermined threshold.

During private research, the inventors have noticed that impregnation, thermal lamination and/or heat pressing of the decorative sheet can lead to a color change in the printed pattern. This may lead to an extensive color match operation to make sure that the color in the final panel is the desired one that may cause an increase of costs for sampling and interruption of production runs.

SUMMARY

The present invention aims in the first place at an alternative method for manufacturing decorative sheets and/or panels that, in accordance with several of its preferred embodiments, is directed to solve one or more of the problems arising in the state of the art.

Thereto, the present invention, according to its first independent aspect, relates to a method for manufacturing decorative sheet that comprises the steps of:

a) providing a first printed substrate having a first decorative image that has been printed using an analog printing technique;

b) acquiring a digital copy of said first decorative image, thereby obtaining a first master image;

c) performing at least a hyperspectral measure on said first decorative image, thereby obtaining a first color profile;

d) printing said first master image on a second substrate using a digital printing technique thereby obtaining a second printed substrate having a second decorative image;

e) performing at least a hyperspectral measure on said second decorative image, thereby obtaining a second color profile;

f) comparing said first and second color profile and determine a similarity index between the first and the second color profile;

g) if said similarity index is below a threshold value, performing an image processing operation on said first master image to obtain a second master image;

h) repeating steps from d) to g) until the similarity index is equal or above the threshold value.

According to said first independent aspect said step b) is performed after said first printed substrate is subjected to a predetermined operation that cause a color shift in said first printed decorative image and in that said step e) is performed after said second printed substrate is subjected to said predetermined operation. In this way the analog to digital conversion is not focused on obtaining an exact copy of the analog décor immediately after printing, but it is directed to provide a copy of the analog décor despite being different from the original after printing, can lead to the closest copy after the predetermined operation. The inventors have found that by comparing the color profiles determined after said predetermined operation has been performed, the analog to digital conversion process can be optimized and the number of trials can be reduced or possibly set to zero. In fact, during private practice the inventors have found that because of the different color build up due by the different printing techniques, the predetermined operation has a different impact on the color of the printed substrate and on that of the second printed substrate. By comparing the color profiles determined after said predetermined operation has been performed, a further color matching operation, after the conversion from analog to digital, can be avoided or at least minimized.

In a preferred embodiment, said digital copy of the first decorative image, is acquired before performing the predetermined operation on said first printed substrate. In this way, the predetermined operation has not yet caused the color change on the first substrate and the prediction on the color change caused on the second substrate can be more accurate.

Said first and/or second color profile can be determined via an intermediate step of measuring color coordinates in multiple predetermined points on the first, respectively second, decorative image. In particular a set color coordinates can be determined for each of said predetermined points. Starting from the color coordinates measured in said predetermined points, the color profile can be determined using dedicated software like, for example, ColorGate Production Server, X-Rite i1Profiler, Heidelberg Prinect Color Toolbox.

Said color coordinates can be for example coordinates of the CIELAB color space. Preferably, said color coordinate set can be determined using a spectrophotometer or a scanner. In a preferred embodiment said color coordinate set can be determined using a photographic camera, more preferably a high-definition photographic camera. Using photographic cameras can provide for a color recognition that is independent from glossiness, reliefs or other surface characteristics of the first and/or second printed substrate.

The similarity index can be determined in various ways without leaving the scope of the patent. The threshold value depends on the similarity index itself. It is also noted that the invention, in an equivalent manner, contemplates the case where in step g) the image processing operation is performed on said first master image to obtain a second master image if the determined similarity index is above said threshold value, and that step h) of repeating steps from d) to g) is performed until the similarity index is equal or below the threshold value.

The similarity index is determined from the comparison between a reference pattern, that Is preferably the first decorative image obtained by analog print, and a second pattern, which is preferably the second decorative image obtained by digital printing. By way of example the similarity index can be determined by comparing color coordinates measured at predetermined points or spots on said first and second decorative image. For example, said color coordinates can be in the CIELAB color space. By way of example the similarity index can be expressed as the average difference between the color coordinates in said spots and can be expressed as a percentage or a ratio. For example, for every spot it can be determined the ratio between the coordinates of the second decorative image and the coordinates of the first decorative image, the average of the determined ratios can form the similarity index.

Preferably said predetermined operation can be performed multiple times on multiple first substrates and/or on multiple second substrate, so that the first and/or the second color profile can be determined from the color coordinates measured on multiple printed substrates with a possible better accuracy.

In a preferred embodiment, said first and/or second printed substrate can be subjected to multiple predetermined operations each causing a color shift at the respective decorative image. Preferably said first and/or second color profile can be calculated only after the last predetermined operation. In this way the operator can subsequently visualize on the display device a prediction of the color that will be obtained after that all the predetermined operations will be performed.

In a preferred embodiment, the method of the first aspect comprises the step of determining a third and/or a fourth color profile before performing said predetermined operation respectively on the first and/or second printed substrate; calculating a first color shift from the third color profile to the first color profile and/or respectively a second color shift from the fourth color profile to the second color profile. Thanks to the calculation of said first and/or color shift it can be possible for an operator to have a better understanding of the impact of the predetermined operation on the color change and it may be possible to use said knowledge in the image processing operation. In a special embodiment, the step of determining a further color profile can be performed before and/or after some, preferably each, predetermined operation and/or after one or more combination of said predetermined operations. In this way a specific color shift can be evaluated for any predetermined operation. In this way it may be possible to improve the understanding of each predetermined operation and/or of combinations of predetermined operations on the color change. Thanks to said improved knowledge said second color profile can be determined on the basis of the calculated color differences. For example said second color profile can be determined on the basis of said calculated difference starting from a starting color profile determined after printing, or even starting from the ICC profile of the printer. In this way it may be possible to predict the color changes caused by one or more planned predetermined operations, so that it may be possible to plan modifications to the further processing of a manufactured décor sheet, for example a decorative panel manufacturing process starting from the décor sheet, and manufacturing said décor sheet in view of said modifications without necessarily manufacturing any samples and performing the predetermined operation with the subsequent determination of a new second color profiles. In this case, in fact, it may be possible to determine the second color profile starting from the knowledge of previous calculations, for example stored in a database, according to the need.

In a special embodiment the first profile can be, or can be converted into, an ICC profile used to set a screen for the visualization of the first master image during the performing of the image processing operation. In this way, an operator can perform the image processing operation while visualizing the color that he/she wants to finally have on the panel, so that the second decorative image will be printed with a different color or color shade in such a way that that the predetermined operation will cause the color on the panel to shift from the printed one to the desired one as predicted.

The first and/or the second master image can be printed using a digital printer, preferably an inkjet digital printer. Said printer can be of the multi pass or, preferably, single pass type. Said printer can be configured to print with a set of inks comprising one more color ink. Said inks can be preferably pigment containing inks and can be water-based, UV-based or hydro-UV based. Oil-based or solvent-based inks are not excluded. In the most preferred embodiment said set of inks comprises at least four inks selected from the group comprising: cyan, magenta, yellow, black, red, light magenta, light red. Preferably, light magenta and/or light red ink can comprise a lower pigment content than the respective non-light ink, preferably less than a fifth of said pigment content.

In the most preferred embodiment, the first printable substrate and the second printable substrate can comprise one or more features in common. Preferably said features in common can be selected from weight per square meter, thickness, material, glass transition temperature, plasticizer content, Gurley value, ash content, resin penetration time. Within the context of the invention with feature in "common" it is meant the feature, in particular the value thereof, are substantially the same in the first substrate and in the second substrate, and that the value of said features can be slightly different from each other, preferably they can differ for less of the 10%, preferably less of the 5%. The inventor has found that more the first and second substrate are similar each other, the higher is the accuracy with which the color change can be predicted.

In a first preferred embodiment, the first substrate can be made of paper. In case the first substrate is made of paper, it is preferably in form of a paper sheet having a base paper weight, i.e. without ink receiving layer, higher than 20 grams per square meter, preferably between 50 to 100 grams per square meter, e.g. between 60 and 80 grams per square meter. Preferably, the paper sheet comprising the ink receiver layer shows a resin penetration time lower than 3 sec. Preferably, the paper sheet is opaque and/or contains titanium oxide as a whitening agent and/or other inorganic fillers. Alternatively, the paper sheet may be a colored, pigmented and/or dyed base paper. The paper layer can show a mean air resistance as expressed in Gurley value below 40 sec, preferably below 25 sec. Paper showings said mean air resistance are more prone to impregnation with resins.

It can be preferred that, according to this first preferred embodiment, the paper used for the first substrate is free from inorganic fillers, like whitening agents or pigments, for example titanium oxide. The paper layer can be made of 100% alfa cellulose.

In a special embodiment the first substrate can comprise a paper sheet having a base paper weight, i.e. without ink receiving layer, lower than 50 grams per square meter, preferably between 20 to 50 grams per square meter. The paper layer according to this special embodiment can show a mean air resistance as expressed in Gurley value below 15 sec. The paper layer according to this special embodiment can be used during a "dry press operation" during HPL, CPL or DPL lamination. With dry press it is meant that the printed paper is not impregnated, but it is sandwiched between two paper layers which contain resin and the bonding is performed during lamination.

In another preferred embodiment, the first substrate is made of a polymeric material. In the most preferred embodiment, the first substrate is preferably in form of a thermoplastic foil, for example made of polyvinylchloride (PVC), polyethylene (PE) or polypropylene (PP) or polyethylene terephthalate (PET). In this case the first substrate can comprise a thickness ranging between 40 micron and 200 microns.

The second substrate can comprise or be provided with an ink receiver layer before being subjected to said predetermined operation, in particular before being printed upon. It is noted that the presence of the ink receiver layer, and the feature thereof, can represent the main difference between the first and the second substrate. In fact, the presence of the ink receiver layer, and the features thereof, depends mainly on the printing techniques. In particular, the first substrate can be free from said ink receiver layer.

In some embodiments the method can comprise the step of providing the second printable substrate with the ink receiver layer, preferably in line with said printer.

Said ink receiver layer can be or be provided in a predetermined amount between 0.5 g/sqm and 5 g/sqm dry weight. Preferably the ink receiver layer comprises at least a binder and/or a pigment.

Preferably, said second substrate is provided with 0.2 to 10 g/m$^2$, and preferably between 0.5 and 5 g/m$^2$ dry coating weight of pigment in said ink receiver layer. Preferably said pigment has a BET surface area between 10 and 1600 m$^2$/g, and preferably between 15 and 500 m$^2$/g. According to the most preferred embodiment, for the pigment of said ink receiver layer at least or mainly silica particles are used. According to variants, for the pigment of said ink receiver layer at least or mainly particles are used chosen from the list consisting of calcium carbonate, alumina, aluminosilicates, ordered mesoporous materials, modified silica, organosilica, modified organosilica, organoalumina, modified alumina, aluminates, modified aluminates, organoaluminates, modified organoaluminates, zeolites, metal organic frameworks and porous polar polymers. According to some deviant embodiments, the ink receiver layer can also be pigment free.

Preferably, said first substrate is provided with 0.2 to 7 g/m$^2$, and preferably between 0.5 and 5 g/m$^2$, dry coating weight of a binder in said ink receiver layer. According to the most preferred embodiment, for the binder in said ink receiver layer at least or mainly polyvinyl alcohols are used. According to variants, the ink receiver layer includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxyethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/ acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); poly-urethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a watery dispersion/emulsion or a watery or solvent solution. As stated above preferred binders for the ink receiving layer include polyvinyl alcohol (PVA), but accord-ing to variants a vinylalcohol copolymer or modified poly-vinyl alcohol may be applied. The modified polyvinyl alco-hol may be a cationic type polyvinyl alcohol, such as the cationic polyvinyl alcohol grades from Kuraray, such as POVAL C506, POVAL C118 from Nippon Goshei. Prefer-ably, said ink receiver layer has, globally seen, a pigment to binder ratio between 0/1 or 0.01/1 and 25/1, preferably between 0/1 or 0.01/1 and 20/1. It is not excluded that the ink receiver layer is non uniform and shows layerwise or areawise differences in composition, in which case the above values are average values for the totality of the inkjet receiver layer.

The ink receiver layer can further comprise a crosslinking agent. Preferably, the ink receiver layer can preferably comprise a content of crosslinking agent below 5% based on dry weight of the composition. The crosslinking agent can be preferably selected from the group comprising: alde-hydes, polyaldehydes, dialdehydes, alcohols, boronic acid, borax, polyalcohols, carbamates, polycarbamates, carbonic acids, glyoxal based agent, zirconium-based agents, titanates and polycarbonic acids.

The ink receiver layer can further comprise a dispersant. A dispersant is an oligomer or polymer which stabilize the liquid dispersions of pigment contained in the ink against flocculation. The dispersant can comprise polycarboxylates, polyphosphates, a polyionic polymer, preferably polyDAD-MAC (Polydiallyldimethylammonium chloride) polyamine or alumina salts.

Preferably, the ink receiver layer is provided with less than 10%, more preferably less than 5% based on dry coating weight of dispersant, for example between 5 and 0%. Preferably, said ink receiver layer has, globally seen, a pigment to dispersant ratio between 10/1 and 100/1.

The ink receiver layer can also comprise a flocculant, preferably a metal salt, preferably a cationic metal salt. Preferably said metal salt is chosen from the list consisting of CaCl2, MgCl2, CaBr2, MgBr2, CMA (Calcium Magne-sium Acetate), NH4Cl, Calcium Acetate, ZrCl4, calcium nitrate and Magnesium Acetate. The positive ion of the dissolved metal salt will tend to neutralize the electrosteric stabilization function of the pigment contained in the ink thereby improving its absorption. The most preferred cat-ionic metal salts are CaCl2, MgCl2, CMA, Calcium Acetate, calcium nitrate and Magnesium Acetate, as the inventors have obtained the best results with these ink reactive com-pounds. Said flocculant can also be chosen from the list consisting of sodiumaluminate, a double sulphate salt such as alum, polyaluminumchloride, polyacrylate, dicyandi-amide (e.g. Floquat DI5 from SNF) and polyacrylamide. The flocculating agent pulls the ink pigments out of the ink dispersion. Thereby the pigments are prevented from pen-etration to far down into the ink receiver layer. Mainly the vehicle of the ink, e.g. the water in the case of waterbased inks, is absorbed deeper down into the ink receiver layer.

Preferably, ink receiver layer is provided with 20 to 60%, based on dry coating weight of flocculating agent, in par-ticular of metal salt.

The ink receiver layer may also comprise one or more of the following agents:

Agents altering, more particularly lowering, the pH of said ink receiver layer. Preferably the pH of the ink receiver layer composition is lowered to pH 6 or lower, by selecting the amount and type of said agent, which selection is within the ambit of the skilled man. Pref-erably said agent is chosen from the list consisting of formic acid, tartaric acid, acetic acid, hydrochloric acid, citric acid, phosphoric acid, sulfuric acid, AlCl$_3$ and boronic acid. An adjusted, more particularly lowered pH, preferably to pH 6 or less, increases the chemical affinity of the inkjet receiver layer with the ink and will interfere with the electrosteric stabilization function on the pigment, such that the dispersion of the pigments in the ink will become destabilized quickly.

Particle surface modifying agents or coupling agents: between 0.05 and 5 g/m$^2$, preferably between 0.2 and 2 g/m$^2$, e.g. chosen from the non-limiting list consisting of amino silanes, ureido silanes, aldehyde silanes, tetraethyl-orthosilicate, siliazanes, organically modified silanes, organically modified siliazanes, chlorosilanes, organically modified chlorosilanes, bissilanes, organobissilanes, silses-quioxanes, polysilsesquioxnes, silane oligomers, organically modified silane oligomers, bissilane oligomers, organically modified bissilane oligomers, oligomeric silsesquioxanes, and oligomeric polysilsesquioxanes.

Additives: wetting agent between 0.005 and 1 g/m$^2$, preferably between 0.05 and 0.5 g/m$^2$; and/or defoam-ing agent between 0.005 and 1 g/m$^2$, preferably between 0.05 and 0.5 g/m$^2$; and/or fungicide between 0.005 and 1 g/m$^2$, preferably between 0.05 and 0.5 g/m$^2$.

According to the most preferred embodiment said inkjet receiver layer is present on the second substrate in the form of a unique layer. Anyway, it is not excluded that said inkjet receiver coating is in the form of two layers, wherein respectively a first layer with a first composition and a second layer with a second composition wherein said first and second composition may be either the same or different compositions.

The predetermined operation can be any operation that is able to cause a color variation on the printed décor. Prefer-ably the predetermined operation can be selected from the group comprising: resin impregnation, heating, pressing, stretching, lamination, applying of a wear layer, lacquering or a combination thereof.

In the preferred embodiment, in case the printable sub-strate comprises a paper sheet, the predetermined operation involves at least impregnating the first and/or substrate with a liquid, preferably a resin, more preferably a thermosetting resin. The thermosetting resin can preferably be a melamine-based resin. Preferably the paper sheet can be impregnated with a quantity of thermosetting resin equaling 40 to 250% dry weight of resin as compared to weight of the paper. Preferably the paper sheet can be provided with such an amount of thermosetting resin, that at least the paper core is satisfied with the resin. Such satisfaction can be reached when an amount of resin is provided that corresponds to at least 1 or at least 2 times the paper weight. It should be clear that the resin, which is provided on the paper sheet, is not necessarily only available in the core of the paper, but may form surface layers on both flat sides of the paper. The inkjet receiver coating may then be present on the surface of the paper with the intermediary of such a surface layer of thermosetting resin. Preferably, the obtained resin provided paper layer, i.e. after provision of the thermosetting resin, has a relative humidity lower than 15%, and still better of 10% by weight or lower. Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer. Next to melamine-based resin, other alternatives such as urea-based resin, polyurethane-dispersion resin, acrylate dispersion resin and combinations thereof can be used.

The predetermined operation may also involve hot pressing the printed and resin provided paper sheet, at least to cure the resin. This paper sheet can be hot pressed on top of a substrate, preferably a wood-based substrate like MDF or HDF, so that this hot pressing simulates or is part of a DPL process. It is of course not excluded that this hot pressing simulates or is part of a CPL (Compact Laminate) or an HPL (High Pressure Laminate) process in which the printed paper sheet is hot pressed at least with a plurality of resin impregnated core paper layers, e.g. of so called Kraft paper, forming a substrate underneath the printed paper sheet, and wherein the obtained pressed and cured laminate layer, or laminate board is, in the case of an HPL, glued to a further substrate, such as to a particle board or an MDF or HDF board.

In case of a printable substrate comprising a thermoplastic sheet, said predetermined operation can preferably involve a thermal lamination of said thermoplastic foil with a second thermoplastic foil, for example a transparent thermoplastic foil. Alternatively, the predetermined operation can preferably involve a thermal lamination of said thermoplastic foil on a substrate, for example a flexible or rigid substrate. Said substrate can be made of a polymeric material, a wood-based material or mineral based material.

Thermal lamination can be conducted at a temperature above 80° C., preferably above 100° C.

Said image processing operation can involve, for example, a graphic design operation and/or a color profile modification. For example, said image processing operation can be performed using Adobe Photoshop®, Gimp®, or similar software.

As mentioned above, the obtained decorative sheet can be used as decorative layer in decorative panels, for example floor, wall, ceiling or furniture panel. The said decorative panels may be of the type comprising a support layer and a top layer, the top layer comprising at least the decorative layer. According to alternative embodiments, the decorative sheet can be used for decorative surfaces in general, for example wallpaper.

The support layer can be a wood-based board or panel, preferably a such as to a particle board or an MDF or HDF board.

Alternatively, the support layer can be made of a polymeric material, preferably a thermoplastic material, for example made of polyvinylchloride (PVC), polyethylene (PE) or polypropylene (PP), PET. It is also possible that the support layer comprises a mineral-based or a cement-based board, for example an MgO-based or a Portland cement board. Said mineral-based or cement-based board can comprise fiber, for example glass or cellulose fibers.

In the preferred embodiment, wherein the panel is a floor panel, the method may comprise the step of providing said support layer with coupling elements for mechanical coupling to another floor panel. Said step of providing the support layer with coupling element is preferably performed after the decorative layer has been provided on the support layer. It is noted that said support layer can also be in form of large board that are cut into multiple laminate panels.

The method of the invention can comprise the step of providing said top layer, including at least said decorative layer, onto said support layer. In particular, the decorative layer can be pressed, heat pressed, thermal laminated or glued on top of the support layer. in the most preferred embodiment, the decorative layer is preferably heat pressed on top of the support layer after it has been impregnated with a resin. Said resin being preferably a melamine-based resin. Said impregnation and/or said heat pressing can be performed substantially in the same way as per the above mentioned predetermined operation.

The top layer can further comprise a wear layer, preferably a transparent layer and possibly comprising hard particles. Said wear layer can comprise a paper sheet impregnated with a resin, preferably the same impregnating printed layer. In some embodiments, said wear layer can comprise a thermoplastic sheet for example made of PVC. The protective layer can be thermally laminated on top of the decorative layer. The thermal lamination of the protective layer on the decorative layer can happen before, during and or after the decorative layer has been provided on the support layer. For example, the protective layer is thermally laminated on top of the decorative layer in the same step of thermal lamination of the decorative layer itself on top of the support layer. In a second preferred embodiment, the protective layer is thermal laminated on top of the decorative layer to form the top layer and subsequently the top layer is either thermally laminated or glued on top of the support layer.

The method of the invention may comprise the step of forming a relief on the surface of said panel. Said relief is preferably formed at least in said top layer. In the most preferred embodiment the relief is in register with the printed décor provided on the printed layer, i.e. the relief has structural feature corresponding to structural features of the printed décor. For example, in case of a printed décor representing a wood imitation the relief has an excavation shaped to imitate a wood pore where the printed décor shows a wood pore. Thanks to the inventive solution proposed herein, it is possible to improve the alignment between the printed décor and the relief since any deformation of the printed décor that can occur before and/or during the alignment of the printed décor with the relief is taken into account.

The relief can be embossed in the top layer during the heat pressing step using an embossment plate or roller. The relief can also be obtained before or after the top layer is provided on the support layer.

It is noted that the method of the invention can also be used to manufacture a decorative sheet starting from a first printed substrate that has been printed using any kind of printing technology, including but not limiting to digital printing technology, for example inkjet printing technology, but that was printed with a different printer and/or in different or unknown printing condition, so that the replication of the first printable substrate is simplified. Thereto, according to its second independent aspect, relates to a method for manufacturing decorative sheet that comprises the steps of:

a) providing a first printed substrate having a first printed decorative image;

b) acquiring a digital copy of said first decorative image, thereby obtaining a first master image;

c) performing at least a hyperspectral measure on said first decorative image, thereby obtaining a first color profile;

d) printing said first master image on a second substrate using a digital printing technique thereby obtaining a second printed substrate having a second decorative image;

e) performing at least a hyperspectral measure on said second decorative image, thereby obtaining a second color profile;

f) comparing said first and second color profile and determine a similarity index between the first and the second color profile;

g) if said similarity index is below a threshold value, performing an image processing operation on said first master image to obtain a second master image;

h) repeating steps from d) to g) until the similarity index is equal or above the threshold value.

According to said second independent aspect said step b) is performed after said first printed substrate is subjected to a predetermined operation that cause a color shift in said first printed decorative image and in that said step e) is performed after said second printed substrate is subjected to said predetermined operation. In a preferred embodiment of the second independent aspect, the first printed decorative image on the first printed substrate can be obtained using a digital printing technique, preferably inkjet printing technology. In some embodiments, the first printable substrate can be printed using a first printer, preferably inkjet printer, and the second printable substrate can be printed using a second printer which can preferably be different from the first printer. For example, the first printer can be a multi pass printer and the second printer can be a single pass printer. In some, embodiment, irrespective of the first being the same or being different, the first and the second printable substrate can be printed under different conditions. For example, the first and the second printable substrate can be printed using different inks, can comprise different substrate properties, paper weight for example, or inkjet receiver layer properties, composition and/or dry weight for example. It is noted that the method according to said second independent aspect can comprise of the features described above in relation to the first independent aspect.

It is noted that the fact of determining an ICC profile from the first color profile and using said color profile to set a display device during the visualization of the first master image during the image processing operation form an inventive concept which is independent from the fact that the second color profile is determined and compared to the first color profile. Thereto, according to its third independent aspect the invention relates to a method for manufacturing a decorative sheet that comprises the steps of:

a) providing a first printed substrate having a first decorative image, that preferably has been printed using an analog printing technique, but that according to alternative embodiments it can be printed using any other printing technique, including digital inkjet printing;

b) acquiring a digital copy of said first decorative image, thereby obtaining a first master image;

c) performing at least a hyperspectral measure on said first decorative image, thereby obtaining a first color profile;

d) determining an ICC profile from said first color profile;

e) setting a display device 8 using said ICC profile and performing a image processing operation while visualizing the first master image using said ICC profile thereby obtaining a second master image;

f) printing said second master image on a second substrate using a digital printing technique thereby obtaining a second printed substrate having a second decorative image wherein said step c) is performed after said first printed substrate is subjected to a predetermined operation that cause a color shift in said first printed decorative image. The method of the second aspect can comprise one or more of the features of the method of the invention according to the first aspect.

BRIEF DESCRIPTION OF THE DRAWINGS

With the intention of better showing the characteristics of the invention, in the following, as an example without any limitative character, several preferred forms of embodiments are described with reference to the accompanying drawings, wherein.

DESCRIPTION OF NON-LIMITING EMBODIMENTS

Figure 1:
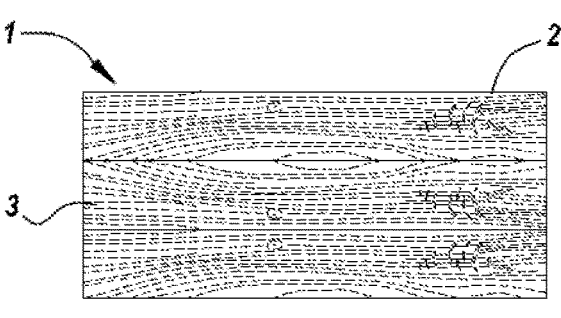
FIG. 1 shows a first printed substrate obtained via gravure printing.

FIG. 1 shows a decorative sheet for laminate panels in form of a first printed substrate 1. Said first printed substrate 1 comprises a base paper 2 having a first decorative image 3 on one of its surfaces. In the example, the first decorative image 3 represents a wood décor and is printed using analog gravure printing.

The base paper 2 of the first printed substrate is a paper suitable for rotogravure and for being impregnated with a thermosetting resin. The base paper 2 comprises a weight between 60 and 80 grams per square meter. Preferably, the base paper 2 is opaque and/or contains titanium oxide as a whitening agent and/or other inorganic fillers. The base paper 2 shows a mean air resistance as expressed in Gurley value below 40 sec, preferably below 25 sec.

Figure 2:
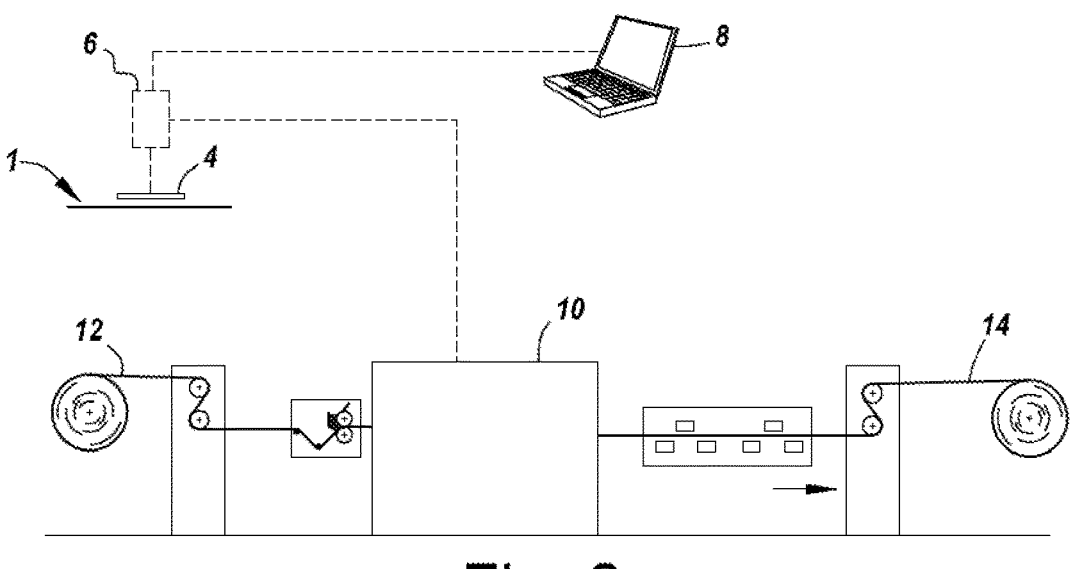
FIG. 2 schematically shows some steps of a method for manufacturing the decorative sheet according to the first independent aspect of the invention.

FIG. 2 shows some step of a method for obtaining the decorative sheet according to the first independent aspect of the invention. The method comprises a first step of providing the first printed substrate 1 as shown in FIG. 1.

The first decorative image 3 is acquired via a scanner 4 to obtain a first master image, that substantially corresponds to a digital copy of the first decorative image 3. The scanner 4 is in communication with a processing unit 6, for example a personal computer having a display 8, which is connected to a printer 10, preferably a multipass inkjet printer.

Figure 3:
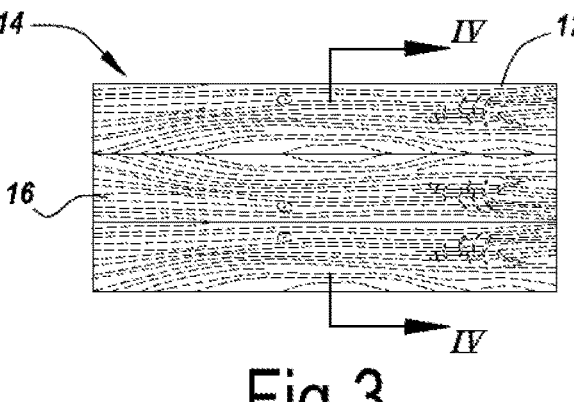
FIG. 3 shows a decorative sheet obtained through the method of the invention.

The first master image is printed on a second printable substrate 12 using the printer 10 to obtain a decorative sheet 14 comprising the second printable substrate 12 and a printed second decorative image 16 (shown in FIG. 3).

Figure 4:
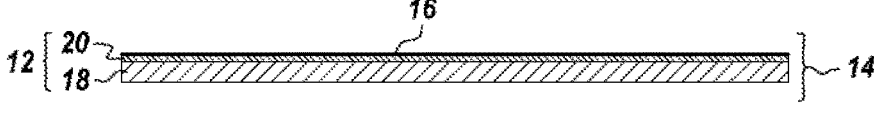
FIG. 4 shows, in an enlarged view, the section of plane IV-IV of FIG. 3.

As shown in FIGS. 3 and 4, the second printable substrate 12 comprises a base paper 18 and an ink receiver layer 20 on a surface of the base paper 18.

In the preferred embodiment, the base paper 18 of the second substrate 12 has substantially the same characteristics of the base paper 2 of the first substrate 1. The base paper 18 is a décor paper for rotogravure printing and is configured to be impregnated with a thermosetting resin. The base paper 18 comprises a weight, i.e. without ink receiving layer 20, between 60 and 80 grams per square meter. The base paper 18, comprising the ink receiver layer 20, shows a resin penetration time lower than 3 sec. Preferably, the base paper 18 is opaque and/or contains titanium oxide as a whitening agent and/or other inorganic fillers. The base paper 18 shows a mean air resistance as expressed in Gurley value below 25 sec.

In the example the ink receiver coating 20 comprises polyvinyl-alcohol as binder and a cationic metal salt chosen from the list consisting of CaCl2, MgCl2, CaBr2, MgBr2, CMA (Calcium Magnesium Acetate), NH4Cl, Calcium Acetate, ZrCl4, calcium nitrate and Magnesium Acetate.

Said ink receiver coating 20 is provided in a predetermined amount between 0.5 g/sqm and 5 g/sqm on the base paper 18.

Figure 5:
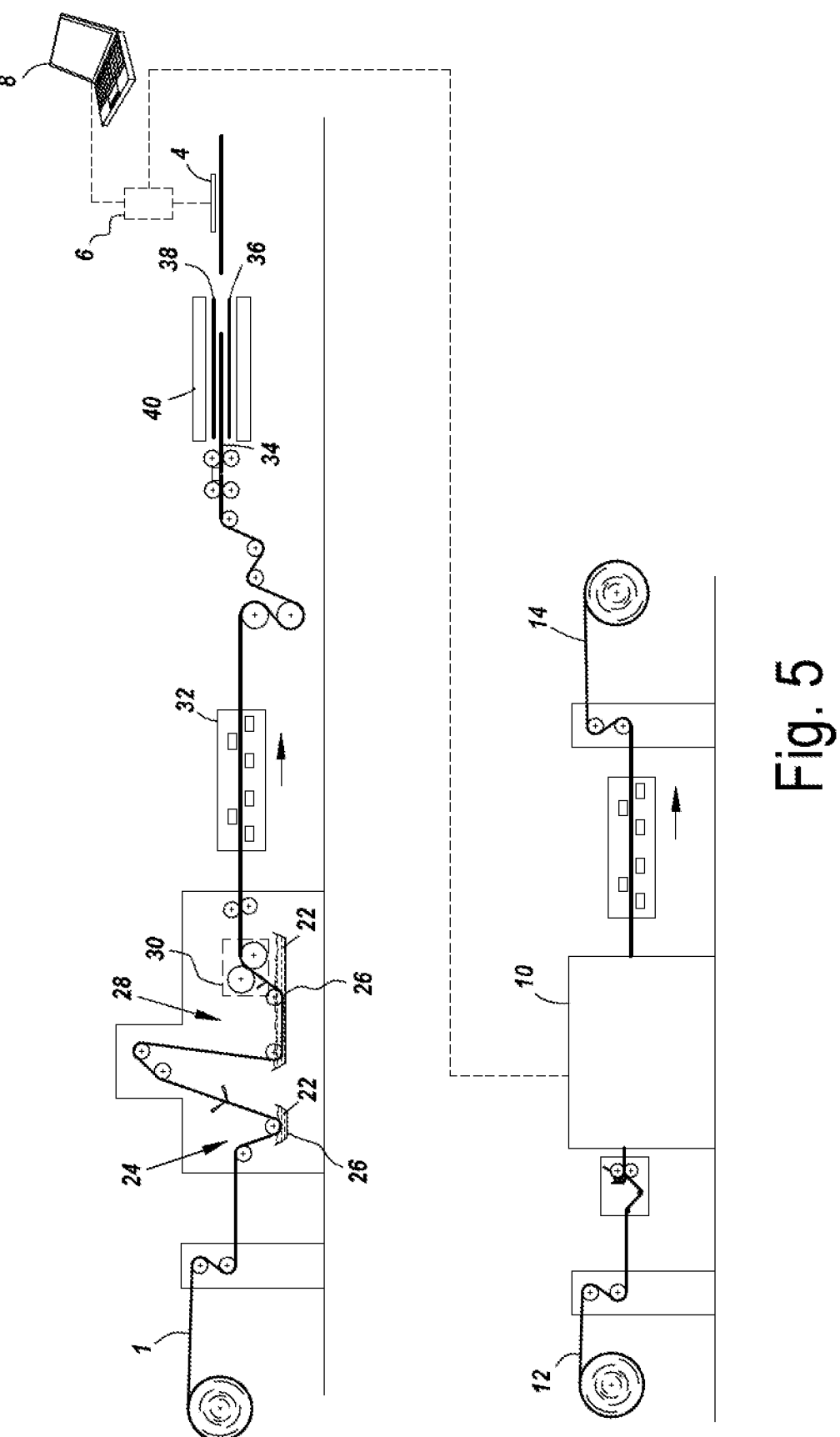
FIG. 5 schematically shows some further steps of a method for manufacturing the decorative sheet according to the first independent aspect of the invention.

The first substrate 1 and the second printed substrate 12 are subjected to a same sequence of predetermined operations as shown in FIG. 5. Since the sequence of the predetermined operations are the same for the first substrate 1 and the second printed substrate 12, in the following paragraphs the sequence is described with reference to the sole first substrate 1.

In the example, the predetermined operation involves impregnating the first substrate 1 with a thermosetting resin 22, in particular a melamine-based resin. For said impregnation, the first substrate 1 is transported to a first impregnation station 24 where said first substrate 1 is immersed in a bath 26 of said thermosetting resin 22, more particularly a mixture of water and thermosetting resin composition. The first substrate 1 is then allowed to rest while in this case being transported upwards. The resting allows for the resin 22 to penetrate the core of the first substrate 1. The first substrate 1 then comes into a second impregnation station 28 where it is, in this case, again immersed in a second bath 26 of resin 22, more particularly a mixture of water and resin. A set of squeezing rollers and doctor blades 30 allows to dose the amount of resin applied to the first substrate 1.

The first substrate 1 is then dried and its residual humidity level is brought to below 10%. In the example a hot air oven 32 is used, but alternatively other heating equipment can be used, such as microwave or infrared drying equipment.

In the example the first substrate 1 is cut to sheet 34 and heat pressed between a base board 36, for example made of MDF, and a transparent layer 38 by means of a hot press 40. Said transparent layer 38 can be for example a resin impregnated overlay paper.

The impregnation and heat pressing, with superimposing of the transparent layer 38, causes a color variation of the first decorative image 3 and of the second decorative image 16. For example, in the second decorative sheet 14, although the CMYK or CRYK color coordinates of the printed second decorative image 16 remain the same, the visual color coordinate in the CIELAB space change.

Using the scanner 4 or a spectrophotometer, multiple sets of color coordinates in the CIELAB space are determined at respective multiple spots in both the first printed substrate 1 and the second printed substrate 12 after performing the predetermined operations as described above. From the measured color coordinates, a first color profile and a second color profile are determined using a software running on the processing unit 6, which respectively correspond to the first substrate 1 and the second substrate 12. The software can be, for example: ColorGate Production Server, X-Rite i1Profiler, Heidelberg Prinect Color Toolbox.

The processing unit 6 determines a similarity index between the first and the second color profiles. If said similarity index is below a predetermined value, for example 95% (meaning that the second color profile is similar to the first color profile for less than the 95%) an image processing operation is performed on the first master image to obtain a second master image with an adapted color profile.

Said second master image is then printed using the printer 10 on a new second substrate 12 to obtain a second decorative sheet 14. The obtained second decorative sheet 14 is then subjected to the sequence of predetermined operation, the color profile measured again, and the similarity index calculated again. If the similarity index is still below the predetermined threshold, a new image processing operation is performed. This cycle terminates when the similarity index is equal to or above the threshold.

In a special embodiment, the first color profile corresponding to the first printed substrate can be used to determine a first ICC profile. The first ICC profile is used to visualize on said display device 8 the master image, in the example a scanned image of a real natural wood. In this way a graphic designer can visualize on the display device 8 what will be the color change after printing and after the predetermined operation. Therefore, the operator can perform an image processing operation on said first master image while visualizing it through the first ICC profile, so that what will be the final visual result on a laminate panel can be simulated, to thereby obtaining a second master image.

Figure 6:
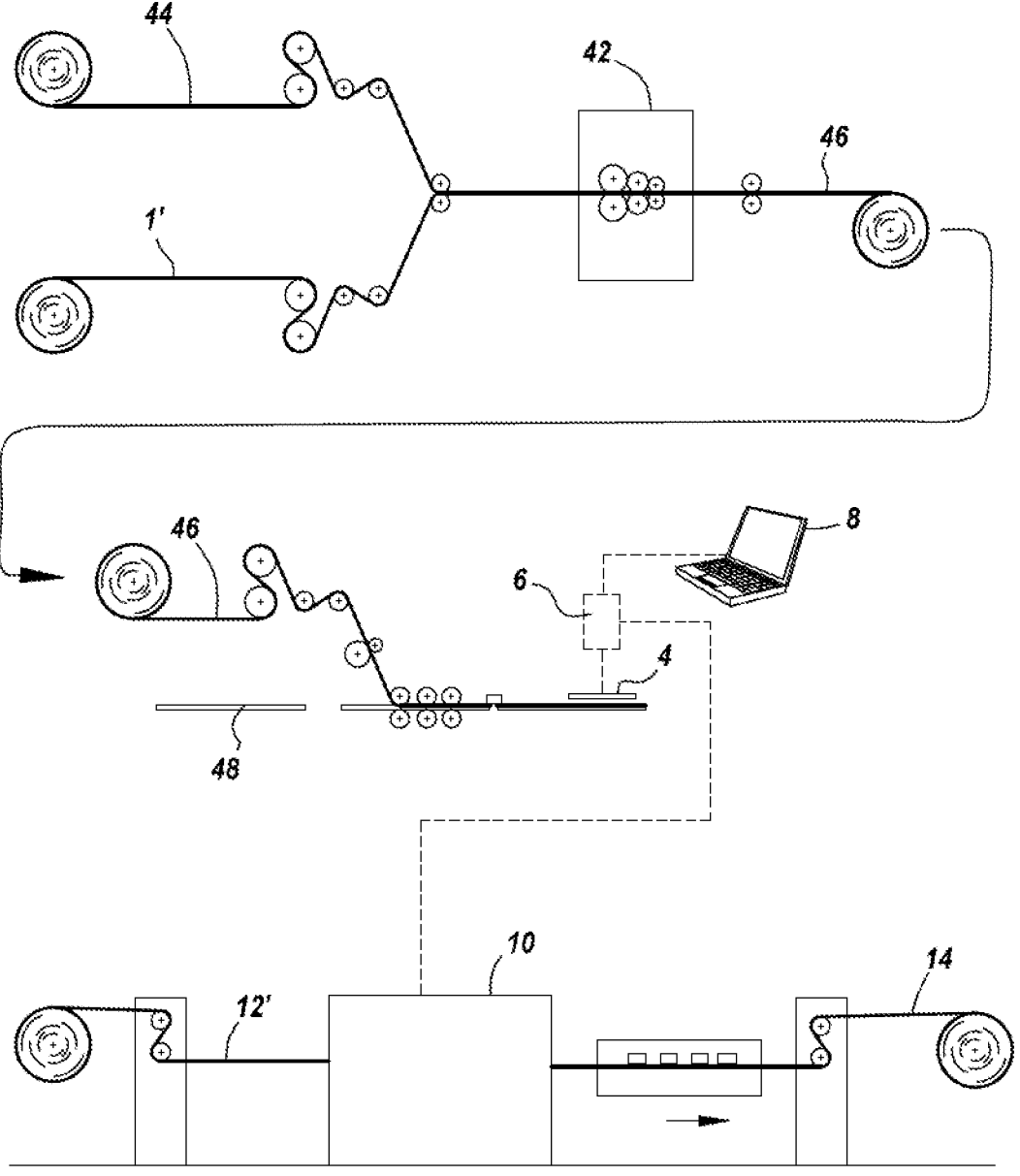
FIG. 6 schematically shows some steps of an alternative method for manufacturing the decorative sheet according to the first independent aspect of the invention.

FIG. 6 shows an alternative embodiment of the invention wherein the first printed substrate 1', comprises a base sheet made of thermoplastic material, preferably PVC.

Similarly, the second substrate 12' of this alternative embodiment comprises a base sheet made of thermoplastic material, preferably PVC, and can comprise an ink receiver layer.

FIG. 6 shows the predetermined operation that in the example involves thermal laminating, in a thermal lamination station 42, the first printed substrate 1' to a transparent wear layer 44 made of thermoplastic material, preferably PVC, to form a top layer 46 for a laminate panel.

The obtained top layer 46 is subsequently attached to a substrate 48, for example made of thermoplastic material like PVC or a mineral based board, via gluing or thermal lamination.

The thermal lamination causes a color variation at the first decorative image. The new color coordinate can be measured with the scanner 4 and the steps of the method repeated as in the first embodiment.

The present invention is in no way limited to the above described embodiments, but such methods, paper layers, panel may be realized according to several variants without leaving the scope of the invention.

The present invention is in no way limited to the hereinabove described embodiments, but such method may be realized according to different variants without leaving the scope of the present invention.

Further, as is clear from the content of the description, the present invention relates to one or more of the items as listed below.

1. A method for manufacturing g a decorative sheet that comprises the steps of:

a) providing a first printed substrate having a first decorative image that has been printed using an analog printing technique;

b) acquiring a digital copy of said first decorative image, thereby obtaining a first master image;

c) performing at least a hyperspectral measure on said first decorative image, thereby obtaining a first color profile;

d) printing said first master image on a second substrate using a digital printing technique thereby obtaining a second printed substrate having a second decorative image;

e) performing at least a hyperspectral measure on said second decorative image, thereby obtaining a second color profile;

f) comparing said first and second color profile and determine a similarity index between the first and the second color profile;

g) if said similarity index is below a threshold value, performing an image processing operation on said first master image to obtain a second master image;

h) repeating steps from d) to g) until the similarity index is equal or above the threshold value;

wherein said step c) is performed after said first printed substrate is subjected to a predetermined operation that cause a color shift in said first printed decorative image and in that said step e) is performed after said second printed substrate is subjected to said predetermined operation.

2. A method for manufacturing a decorative sheet that comprises the steps of:

g) providing a first printed substrate having a first decorative image that has been printed using an analog printing technique;

h) acquiring a digital copy of said first decorative image, thereby obtaining a first master image;

i) performing at least a hyperspectral measure on said first decorative image, thereby obtaining a first color profile;

j) determining an ICC profile from said first color profile;

k) setting a display device 8 using said ICC profile and performing a image processing operation while visualizing the first master image using said ICC profile thereby obtaining a second master image;

l) printing said second master image on a second substrate using a digital printing technique thereby obtaining a second printed substrate having a second decorative image wherein said step c) is performed after said first printed substrate is subjected to a predetermined operation that cause a color shift in said first printed decorative image.

3. The method according to any of the preceding items, wherein said first substrate 1 and/or said second printable substrate 12 comprises a base paper 2, 18 or a thermoplastic foil 12'.

4. The method according to any of the preceding items, wherein said second printable substrate 12 comprises an ink receiver layer 20.

5. Method according to any of the preceding items wherein said predetermined operation is selected between the group comprising: impregnating, heating, pressing, gluing, covering with a transparent layer and/or laminating.

6. Method according to any of the preceding items, wherein said printing operation is performed via inkjet printing, preferably single pass or multipass printing.

7. Method according to any of the preceding items, wherein the second substrate 12 comprises one or more features in common with the first substrate 1, preferably said feature in common belong to the group comprising: weight, thickness, Gurley value, resin penetration time, ash content, glass transition temperature, plasticizer content, composition.

8. Method according to any of the preceding item, wherein said first and/or second color profile is determined using a spectrophotometer, an optical scanner or a photographic camera.

9. The method according any of the preceding items, wherein said first substrate 10 and/or second substrate are subjected to multiple predetermined operation each causing a color shift, preferably step c), respectively e), is performed after some, preferably each, predetermined operation and/or after one or more combination of said predetermined operations.

10. The method according to item 9, wherein the color profiles measured after each predetermined operations are stored in a database.

11. The method according to item 10, wherein the method involves planning one or more predetermined operation to be performed on the decorative sheet, and the step of determining the second and/or first color profile, or determining the ICC profile, on the basis of said plan and of the sets of color profiles stored in the database.

12. The method according any of the preceding items, wherein a third, respectively fourth, color profile are determined for said first and/or second substrate 1, 12 before performing said predetermined operation, preferably a color shift between said third and first, respectively fourth and second color profile is calculated.

13. The method according to any of the preceding items, wherein said predetermined operation is performed multiple times on multiple first substrate 1 and/or second substrate 12 and wherein one first color profile, respectively second color profile, is determined for each first substrate 1 and/or second substrate.

14. The method according to any of the preceding items, wherein said printing operation is performed using one or more inks, preferably pigment containing inks, preferably water-based, UV-based, hydro-UV-based, oil-based or solvent-based.

15. The method according to any of the preceding items, wherein said inks are selected from the group comprising: cyan, magenta, red, yellow, black, light cyan, light magenta, light red.

16. The method according to any of the preceding items, wherein said first and/or second color profile and/or ICC profile are determined via a software, preferably ColorGate Production Server, X-Rite i1Profiler or Heidelberg Prinect Color Toolbox.

17. The method according to any item 1 and/or any items from 3 to 16, wherein an ICC profile is determined from said first color profile and wherein the method comprises setting a display device 8 using said ICC profile and performing said image processing operation while visualizing the first master image using said ICC profile.

18. The method according to any of the preceding items, wherein said display device 8 is a screen or a monitor, preferably of a personal computer.

19. The method according to any of the items form 2 to 18 that comprises the steps of;
   I) performing at least a hyperspectral measure on said second decorative image, thereby obtaining a second color profile;
   wherein said hyperspectral measure is performed after said second substrate is subjected to a predetermined operation;
   II) comparing said first and second color profile and determine a similarity index between the first and the second color profile;
   III) if said similarity index is below a threshold value, performing the image processing operation on said master image to obtain a further master image;
   repeating steps from I) to III) until the similarity index is equal or above the threshold value.

20. The method according to any of the preceding items wherein the firsts and the second substrate are subjected to the same predetermined operation.

21. A method for manufacturing decorative sheet that comprises the steps of:
   a) providing a first printed substrate having a first printed decorative image e;
   b) acquiring a digital copy of said first decorative image, thereby obtaining a first master image;
   c) performing at least a hyperspectral measure on said first decorative image, thereby obtaining a first color profile;
   d) printing said first master image on a second substrate using a digital printing technique thereby obtaining a second printed substrate having a second decorative image;
   e) performing at least a hyperspectral measure on said second decorative image, thereby obtaining a second color profile;
   f) comparing said first and second color profile and determine a similarity index between the first and the second color profile;
   g) if said similarity index is below a threshold value, performing an image processing operation on said first master image to obtain a second master image;
   h) repeating steps from d) to g) until the similarity index is equal or above the threshold value;
   wherein said step b) is performed after said first printed substrate is subjected to a predetermined operation that cause a color shift in said first printed decorative image and in that said step e) is performed after said second printed substrate is subjected to said predetermined operation.

22. The method according to item 21, wherein the first printed decorative image on the first printed substrate is obtained using a digital printing technique, preferably inkjet printing technology.

23. The method according to item 21 or 22, wherein the first printable substrate can be printed using a first printer, preferably inkjet printer, and the second printable substrate can be printed using a second printer which can preferably be different from the first printer.

24. The method according to item 23, wherein the first printer can be a multi pass printer and the second printer can be a single pass printer.

25. The method according to any of items from 21 to 24, wherein the first and the second printable substrate can be printed under different conditions.

26. The method according to item 25, wherein the first and the second printable substrate can be printed using different inks, can comprise different substrate properties, paper weight for example, or inkjet receiver layer properties, composition and/or dry weight for example.

27. Method for manufacturing decorative panels having a top layer comprising a decorative sheet 14, wherein said decorative sheet 1 is obtained in the method according to any of the preceding items.

28. Method according to item 27, wherein it comprises the step of performing said predetermined operation on the decorative sheet.

29. Method according to item 27 or 28, wherein the panel comprises a substrate, preferably made of MDF, HDF, thermoplastic material, mineral-based or cement-based boards.

30. Method according to any of items from 27 to 23, comprising providing a transparent layer on top of the decorative sheet.

31. Method according to any of items from 27 to 30, wherein said decorative panel is a floor, wall, ceiling and/or furniture panel.

The invention claimed is:

1. A method for manufacturing a decorative sheet, the method comprising:
   a) providing a first printed substrate having a first substrate with a first decorative image that has been printed using an analog printing technique;
   b) acquiring a digital copy of the first decorative image, thereby obtaining a first master image;
   c) performing at least a hyperspectral measure on the first decorative image, thereby obtaining a first color profile;
   d) printing the first master image on a second substrate using a digital printing technique thereby obtaining a second printed substrate having a second decorative image;
   e) performing at least a hyperspectral measure on the second decorative image, thereby obtaining a second color profile;
   f) comparing the first and the second color profiles and determine a similarity index between the first and the second color profiles;
   g) if the similarity index is below a threshold value, performing an image processing operation on the first master image to obtain a second master image;
   h) repeating d) to g) until the similarity index is equal to or above the threshold value;
   wherein c) is performed after the first printed substrate is subjected to a predetermined operation that cause a color shift in the first decorative image; and
   wherein e) is performed after the second printed substrate is subjected to the predetermined operation.

2. The method according claim 1, wherein the first substrate and/or the second substrate comprises a base paper, or a thermoplastic foil.

3. The method according to claim 1, wherein the second substrate comprises an ink receiver layer.

4. The method according to claim 1, wherein the predetermined operation is selected from the group comprising: impregnating, heating, pressing, gluing, covering with a transparent layer and/or laminating.

5. The method according to claim 1, wherein the printing in d) is performed via inkjet printing.

6. The method according to claim 1, wherein the second substrate comprises one or more features in common with the first substrate.

7. The method according to claim 1, wherein the first and/or the second color profile is determined using a spectrophotometer, an optical scanner or a photographic camera.

8. The method according claim 1, wherein the first substrate and/or the second substrate are subjected to multiple predetermined operations each causing a color shift.

9. The method according to claim 8, wherein the first and the second color profiles measured after each predetermined operation are stored in a database.

10. The method according to claim 9, further comprising:

planning one or more predetermined operation to be performed on the decorative sheet; and determining the second and/or the first color profile, or determining an ICC profile, on the basis of the plan and of the sets of color profiles stored in the database.

11. The method according claim 1, wherein a third and a fourth color profile are respectively determined for the first and/or the second substrate, before performing the predetermined operation.

12. The method according to claim 1, wherein an ICC profile is determined from the first color profile; and wherein the method comprises setting a display device using the ICC profile and performing the image processing operation while visualizing the first master image using the ICC profile.

13. The method according to claim 1, wherein the predetermined operation is performed multiple times on multiple first substrates and/or second substrates; and wherein one first color profile and one second color profile is respectively determined for each first substrate and second substrate.

14. The method according to claim 1, wherein the printing in d) is performed using one or more inks.

15. The method according to claim 1, wherein the inks are selected from the group comprising: cyan, magenta, red, yellow, black, light cyan, light magenta, light red.

16. The method according to claim 1, wherein the first and/or the second color profile and/or an ICC profile are determined via a software.

17. A method for manufacturing a decorative sheet, the method comprising:

a) providing a first printed substrate having a first decorative image that has been printed using an analog printing technique;

b) acquiring a digital copy of the first decorative image, thereby obtaining a first master image;

c) performing at least a hyperspectral measure on the first decorative image, thereby obtaining a first color profile;

d) determining an ICC profile from the first color profile;

e) setting a display device using the ICC profile and performing an image processing operation while visualizing the first master image using the ICC profile thereby obtaining a second master image;

f) printing the second master image on a second substrate using a digital printing technique thereby obtaining a second printed substrate having a second decorative image;

wherein c) is performed after the first printed substrate is subjected to a predetermined operation that cause a color shift in the first decorative image.

18. The method according to claim 17, further comprising:

I) performing at least a hyperspectral measure on the second decorative image, thereby obtaining a second color profile;

wherein the hyperspectral measure is performed after the second substrate is subjected to a predetermined operation;

II) comparing the first and the second color profiles and determine a similarity index between the first and the second color profiles;

III) if the similarity index is below a threshold value, performing the image processing operation on the master image to obtain a further master image;

repeating I) to III) until the similarity index is equal to or above the threshold value.

19. A method for manufacturing a decorative sheet, the method comprising:

a) providing a first printed substrate having a first printed decorative image;

b) acquiring a digital copy of the first printed decorative image, thereby obtaining a first master image;

c) performing at least a hyperspectral measure on the first printed decorative image, thereby obtaining a first color profile;

d) printing the first master image on a second substrate using a digital printing technique thereby obtaining a second printed substrate having a second decorative image;

e) performing at least a hyperspectral measure on the second decorative image, thereby obtaining a second color profile;

f) comparing the first and the second color profiles and determine a similarity index between the first and the second color profiles;

g) if the similarity index is below a threshold value, performing an image processing operation on the first master image to obtain a second master image;

h) repeating d) to g) until the similarity index is equal to or above the threshold value;

wherein b) is performed after the first printed substrate is subjected to a predetermined operation that cause a color shift in the first printed decorative image; and wherein e) is performed after the second printed substrate is subjected to the predetermined operation.

20. The method according to claim 19, wherein the first printed decorative image on the first printed substrate is obtained using a digital printing technique.

* * * * *